2,832,255

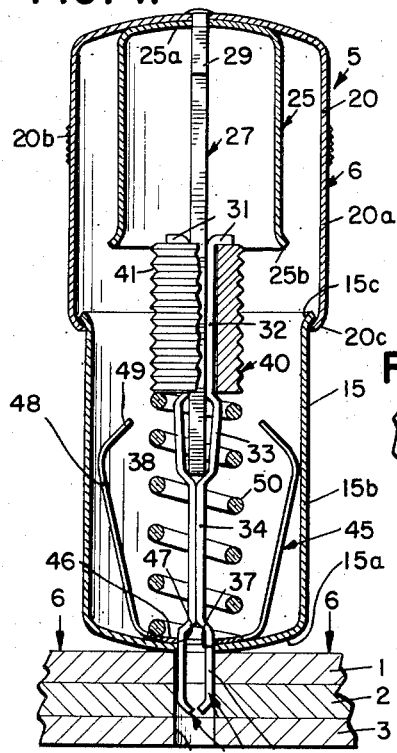
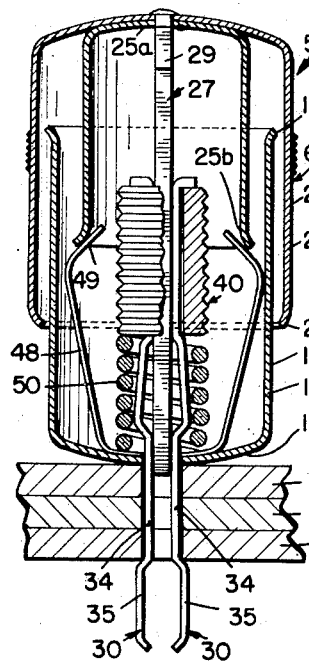
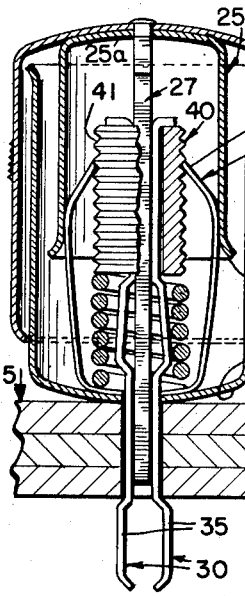
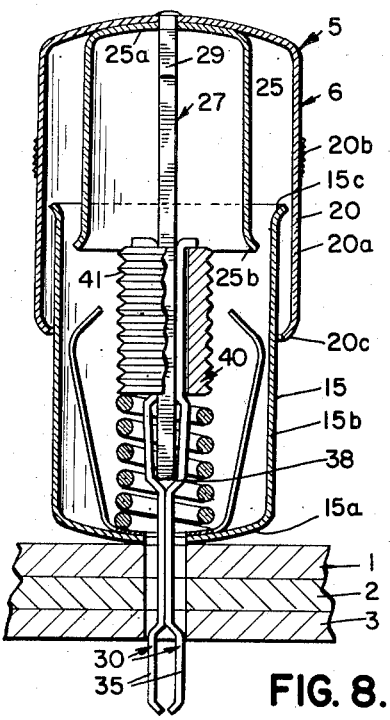
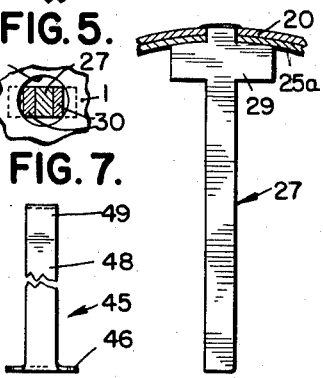

SHEET METAL CLAMP HAVING LEAF SPRING LOCKING MEMBER

Frank Charles Wallace, North Hollywood, Calif., assignor of one-half to E. R. Livingston, Los Angeles, Calif.

Application September 20, 1954, Serial No. 457,047

8 Claims. (Cl. 85—6)

This invention has to do with sheet metal clamps of the type commonly known in the art as temporary rivets.

In sheet metal work, such as the riveting of sheets to form airplane fuselages, the sheets are drilled to provide rivet holes and are assembled with the rivet holes of one sheet registering with the holes of another sheet, those assembled sheets being temporarily held together, with the rivet holes in register, by means of such sheet metal clamps, while the permanent rivets are applied in adjoining registering holes. The clamps are removed as permanent rivets are installed. Inasmuch as it is highly desirable that the clamp draw the sheets together while holding them with their rivet holes in register, such clamps are conventionally equipped with compression springs which resiliently urge the clamping pins inwardly of the body so that the sheets are clamped between the end of the clamp body and the headed outer ends of the retaining or clamping pins. Heretofore, sheet metal clamps of this character have been of such construction that they require a very heavy retaining pin retracting spring and require an applying tool to compress the spring and project the outer ends of the retaining pins relative to the clamp body, and they have possessed the further shortcoming that sometimes the heads of the retaining pins break off and permit the spring to propel the clamp body through the air, the clamp body frequently striking and causing serious injury to workmen.

It is therefore an object and accomplishment of my invention to provide a sheet metal clamp which may be applied to and removed from the work by hand and without the aid of separate tools, and which also effectively draws the work sheets together.

It is a further object and accomplishment of my invention to provide a sheet metal clamp of this character wherein an automatic lock is provided for maintaining the parts in work-clamping position.

A further object and accomplishment of my invention is to provide a sheet metal clamp which may be made and assembled with unusual economy.

A still further object and accomplishment of my invention is to provide a sheet metal clamp which eliminates hazards of injury to workmen due to breakage of the retaining pins.

Further objects and advantages will appear hereinafter.

Without intending thereby to limit the broader scope of my invention, except as may appear from the appended claims, I shall now describe a presently preferred embodiment thereof, for which purpose I shall refer to the accompanying drawings wherein:

Fig. 1 is a medial, longitudinal section of my clamp device before the parts are moved into work clamping position.

Fig. 2 is a view like Fig. 1 but showing the position of the parts during the first stage of operation;

Fig. 3 is a view like Fig. 1 but showing the position of the parts during the second stage of operation.

Fig. 4 is a view like Fig. 1 but showing my clamp in the position which the parts occupy when the device is in final work-clamping position;

Fig. 5 is a section taken on line 5—5 of Fig. 4;

Fig. 6 is a section taken on line 6—6 of Fig. 1;

Fig. 7 is a side elevation of the locking and pressure exerting member; and

Fig. 8 is a side elevation showing the spreader element and the manner in which it is attached to the clamp body.

With particular reference to the drawings:

The numerals 1, 2 and 3 denote three typical superimposed work sheets each having a rivet-passing hole or perforation 4, which holes are in register with each other.

My clamp device, generally noted 5, comprises a body 6 composed of an inner cup-shaped shell or body portion 15, whose end wall 15a is rounded or convexed to minimize its point of engagement with the work sheet and whose side wall 15b is preferably cylindrical and terminates at its top end in an outturned peripheral flange 15c; and an inverted cup-shaped outer shell or body portion 20 which telescopically fits over the inner shell 15. Side wall 20a of the outer shell is preferably cylindrical and presents exterior knurling 20b to facilitate its being gripped by the fingers of the user. The outer shell has a bottom inturned annular flange 20c positioned to abut flange 15c to limit separative movement of the inner and outer shell.

An inverted cup-shaped guide or cam member 25 has its end wall 25a held against the end wall of the outer shell 20 by the inner end portion of a spreader or expander 27. The spreader has a cross portion 29 and the top end of the spreader is peened so that the end wall 25a of the cam member and the end wall of the outer shell are clamped between the cross and peened portions of the spreader, the spreader extending through registering axial holes in said end walls. Preferably the bottom end portion 25b of cam 25 is outwardly flared.

I also provide a clamping member comprising a pair of clamping or retaining pins 30, each having a flanged top or inner end portion 31, an adjoining straight portion 32, a next adjoining outwardly bowed portion 33, a next adjacent straight portion 34, and terminating at its bottom end in an outwardly bowed portion 35, said retaining pins being disposed in juxtaposition and in opposed relationship, with the bottom ends 35 of the pins projecting through an axial opening 37 in the end wall 15a of the body portion 15, said opening 37 preferably being of the same diameter as the respective holes 4 in the work sheets.

The upper straight portions 32 of the retaining pins are confined within a sleeve 40 whose exterior is provided with annular grooves or serrations 41 for the purpose to be described, while the flanged top ends 31 of the retaining pins rest against the top end of the sleeve. Preferably the grooves or serrations should be closely spaced, a preferential spacing to be of the order of 20 thousandths of an inch.

The spreader or expander 27, being flat or rectangular in cross section, is engageable between the straight spaced portions 32 of the retaining pins to urge them laterally against the inner surface of the sleeve to hold them in assembly, the lower end of the sleeve engaging the upper ends of the bowed portions 33 of the pins. The spreader is prevented from entering between the straight, parallel, abutting portions 34 of the pins during telescoping movement of the body portions 15, 20 until the outwardly bowed outer end portions 35 of the pins pass outwardly of the body portion 15 and through the holes 4 in the work sheets since the bowed portions 35 bear against the sidewalls of holes 4 and opening 37 and the sleeve 40 confines the portions 32 of the pins. Thus, the bottom or inner end of the spreader bears against the shoulders 38, formed by the bottom ends of the upper bowed portions 33 of the pins, during the first stage of the telescoping movement of body portions 15 and 20, and moves the pins into protracted position until the bottom bowed portions 35 of the pins pass through holes 4 in the sheets (Fig. 2), and then further telescoping movement of body portions 15 and 20 causes the spreader to enter between portions 34 of the pins to spread them apart and prevent withdrawal of the pins from the holes 4 until said body portions are moved into untelescoped position (Fig. 3).

A U-shaped locking and locking member in the form of a leaf spring 45 has its bottom or cross portion 46 resting against the inner surface of the end wall 15a of body portion 15, there being a hole 47 through said cross portion to pass the retaining pins.

The resilient opposed side legs 48 of the locking member are outwardly bowed, terminate at their upper ends in inwardly disposed converging portions 49, the intersection of said inwardly disposed portions with the contiguous leg portions being curved so that engagement with the cam member 25 cams the portions 49 into locking engagement with the grooved or serrated sleeve 40. The flare 25b of member 25 facilitates entry of the legs 48 into the cam member 25.

A compression spring 50 surrounds the retaining pins and bears at its bottom end against the cross portion 46 of the locking member and bears at its top end against the bottom end of sleeve 40.

In operation, starting with the parts in the position shown in Fig. 1 (in which the retaining pins are retracted into the body except for the partial projection of the bowed end portions 35), the user places the projecting portions of the retaining pins in the hole 4 in the topmost sheet with the end wall 15a of the body against said sheet. He then pushes the outer body portion 20 toward the work sheets, thus telescoping the body portions 15 and 20. As the body portions are thus being telescoped, the bottom end of the spreader will first engage the shoulders 38 and protract the bowed portions 35 through the holes in the work sheets until they are in the position shown in Fig. 2. When this position is reached, the spreader will enter between portions 34 of the pins and spread the pins apart into the position of Fig. 3. As the spreader moves downwardly between portions 34 of the legs, the outwardly bowed legs 48 of member 45 will enter the cam member 25 and cause engagement of the free ends of those legs to engage the serrations of the sleeve 40, flexing the legs into relatively straightened or lengthened positions and thus resiliently urging the sleeve 40 and the pins inwardly of the body (Fig. 4). Since the pins are then in expanded position, the lower bowed portions 35 of the pins cannot be retracted through the holes 4 in the sheets, and thus the straightening of legs 48 will have the function of resiliently urging the pins retracted and resiliently clamping the sheets between portions 35 of the pins and the end wall 15a of the body. Also the clamp will be thus locked in such clamping position by this cooperative action of sleeve 40, legs 48 and cam member 25, until the user pulls upwardly on the body portion 20, which withdraws the cam member 25 from engagement with the arms 48 and permits the spring to return the parts to the position of Fig. 3.

From the foregoing description it will be apparent that I have provided a clamp device which may be economically made and assembled, which may be completely operated by hand without the aid of applying tools, which provides ample resilient clamping of the sheets together, and which eliminates hazards of personal injury to workmen.

I claim:

1. A clamp comprising a body having two telescopically associated shell portions mounted for relative axial telescopic movement, a laterally expansible clamping member carried by the body for protractive and retractive movement through an end thereof, means carried by one of said shell portions and operable in response to relative axial movement of said shell portions in one direction first to protractively move and thence to laterally expand said clamping member, a normally bowed leaf spring carried by the body in position to be flexed into engagement with said clamping member and thence to be flexed into relatively straightened position, and a cam carried by one of said shell portions in position to engage and so flex said leaf spring in response to said relative axial telescopic movement of said shell portions.

2. A clamp comprising a body having two telescopically associated shell portions mounted for relative axial movement, a laterally expansible clamping member carried by the body for protractive and retractive movement through an end thereof, means carried by one of said shell portions and operable in response to relative axial movement of said shell portions in one direction first to protractivelym ove and thence to laterally expand said clamping member, a normally bowed leaf spring carried by the body in position to be flexed into engagement with said clamping member and thence to be flexed into relatively straightened position, and cam means carried by one of said shell portions and engageable with said leaf spring to so flex the same in response to said relative movement, said cam means also being operable in response to said relative axial movement of said shell portions to lock said leaf spring in said flexed position.

3. A clamp comprising a body having two telescopically associated shell portions mounted for relative axial movement, a laterally expansible clamping member carried by the body for protractive and retractive movement through an end thereof, means carried by one of said shell portions and operable in response to relative axial movement of said shell portions in one direction first to protractively move and thence to laterally expand said clamping member, a normally bowed leaf spring carried by the body in position to be flexed into engagement with said clamping member and thence to be flexed into relatively straightened locking position, a cam carried by one of said shell portions in position to engage and so flex said leaf spring in response to said relative axial movement of said shell portions, and a compression spring carried by the body and bearing against said clamping member to move said clamping member retractively when said leaf spring is out of said relatively straightened locking position.

4. A clamp comprising a body having two opposed coaxial relatively movable portions, the first of which has a bottom end wall presenting an axial opening, sheet clamping member mounted in the body for protractive and retractive movement through said opening, said member comprising a pair of juxtaposed, opposed, resilient pins each having: a flanged inner end portion, a contiguous first straight portion, a next contiguous first outwardly bowed portion providing an inwardly facing shoulder, a next contiguous second straight portion and terminating in an outwardly bowed outer end portion; an externally serrated sleeve embracing said first straight portions of said pins and disposed between said flanged inner end portions and said first outwardly bowed portions, said outer end portions of said pins being normally disposed within said opening and said second straight portions of said pins being parallel and normally in abutting relationship, a spreader bar fixed to the second of said body portions and normally disposed between said first straight portions and said first bowed portions of said pins, a U-shaped leaf spring disposed with its closed end between said end wall of said first body portion and said sleeve and having its side portions outwardly bowed and disposed towards the top end of the second of said body portions, and an inverted cup-shaped cam member carried by the second of said body portions in position to engage said side portions of said leaf spring and flex them into engagement with the periphery of said sleeve and thence to further flex them into relatively straightened position in response to relative movement of said body portions towards each other; said spreader bar being operable in response to relative movement of said body portions towards each other first to engage said shoullders and protractively move said pins and thence to enter between the second straight portions of said pins and spread the same apart.

5. The device of claim 4 which further includes a compression spring in the body opposing protractive movement of said pins.

6. The device of claim 4 wherein said body portions are telescopically associated.

7. A clamp comprising a body having two relatively movable portions, a sheet clamping member carried by the body for protractive and retractive movement through an end thereof, said clamping member being movable protractively in response to relative movement of said body portions, and actuating means carried by the body and being normally out of but flexible laterally into limited resilient retractive engagement with said clamping member in response to further relative movement of said body portions; said actuating means comprising a serrated sleeve surrounding the inner end portion of said clamping member, a U-shaped leaf spring carried by one of said portions and having outwardly bowed side portions disposed to be flexed first into engagement with said sleeve and thence into relatively straightened position, and a cam carried by the other of said body portions in position to so flex said side portions of said spring.

8. A clamp comprising a body having two relatively movable portions, a sheet clamping member carried by the body for protractive and retractive movement through an end thereof, said clamping member being movable protractively in response to relative movement of said body portions, and actuating means carried by the body and being normally out of but flexible laterally into limited resilient retractive engagement with said clamping member in response to further relative movement of said body portions; said actuating means comprising a serrated sleeve surrounding the inner end portion of said clamping member, a U-shaped leaf spring carried by one of said portions and having outwardly bowed side portions disposed to be flexed first into engagement with said sleeve and thence into relatively straightened position, and a cam carried by the other of said body portions in position to so flex said side portions of said spring, said cam being operable in response to said relative movement of said body portions to lock said side portions of said spring in said engagement with said sleeve.

References Cited in the file of this patent

UNITED STATES PATENTS

| | | |
|---|---|---|
| 1,112,425 | Seivert | Sept. 29, 1914 |
| 2,256,243 | Edwards | Sept. 16, 1941 |
| 2,350,630 | Melcher | June 6, 1944 |
| 2,369,410 | Rossman | Feb. 13, 1945 |

FOREIGN PATENTS

| | | |
|---|---|---|
| 556,828 | Great Britain | Oct. 22, 1943 |